US006274543B1

(12) United States Patent
Milbrath et al.

(10) Patent No.: US 6,274,543 B1
(45) Date of Patent: *Aug. 14, 2001

(54) CLEANING AND COATING COMPOSITION AND METHODS OF USING SAME

(75) Inventors: Dean S. Milbrath, West Lakeland Township; Ann T. Anich, Little Canada; John G. Owens, Woodbury, all of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,098

(22) Filed: Apr. 27, 1999

Related U.S. Application Data

(60) Provisional application No. 60/088,168, filed on Jun. 5, 1998.

(51) Int. Cl.[7] ............................... C11D 7/30; C11D 3/24
(52) U.S. Cl. ............................................ 510/412; 252/364
(58) Field of Search ............................... 510/412; 252/364

(56) References Cited

U.S. PATENT DOCUMENTS

| 4,999,127 | 3/1991 | Merchant | 252/171 |
|---|---|---|---|
| 5,064,559 | 11/1991 | Merchant et al. | 252/171 |
| 5,064,560 | 11/1991 | Merchant | 252/171 |
| 5,196,137 | 3/1993 | Merchant | 252/172 |
| 5,658,962 | 8/1997 | Moore et al. | 521/114 |
| 5,756,002 | * 5/1998 | Chen et al. | 252/364 |
| 5,827,446 | * 10/1998 | Merchant et al. | 252/67 |
| 6,048,471 | * 4/2000 | Henry | 252/364 |

FOREIGN PATENT DOCUMENTS

| 0465037 | * 1/1992 | (EP) . |
|---|---|---|
| 0 465 037 A1 | 1/1992 | (EP) . |
| 5-004003 | 1/1993 | (JP) . |
| WO 96/13569 | 5/1996 | (WO) . |
| WO 96/22356 | 7/1996 | (WO) . |
| WO 96/36688 | 11/1996 | (WO) . |
| WO 96/36689 | 11/1996 | (WO) . |
| WO 98/37163 | 8/1998 | (WO) . |

* cited by examiner

*Primary Examiner*—Mark Kopec
*Assistant Examiner*—Charles Boyer
(74) *Attorney, Agent, or Firm*—Lisa M. Fagan

(57) ABSTRACT

The invention provides a non-flammable cleaning composition comprising (a) a major amount of one or more highly fluorinated compounds having a boiling point less than about 100° C.; (b) a minor amount of one or more fluorinated compounds containing at least one aromatic moiety and having a boiling point between about 100° C. and about 140° C.; and (c) a minor amount of trans-1,2-dichloroethylene.

15 Claims, 3 Drawing Sheets

CLEANING AND COATING COMPOSITION AND METHODS OF USING SAME

This application claims the benefit of U.S. Provisional Application No. 60/088,168, filed Jun. 5, 1998.

FIELD OF THE INVENTION

This invention relates to blends of halogenated materials useful as a cleaning and coating composition. More particularly, the invention relates to non-flammable cleaning compositions having silicone solvency and plastics compatibility.

BACKGROUND OF THE INVENTION

Chlorofluorocarbon compounds (CFCs) and hydrochlorofluorocarbon compounds (HCFCs) as a class possess unique chemical stability and solvent properties and have until only recently been used in a wide variety of applications. Among other applications, CFCs have found utility in drying processes, cleaning processes (e.g., the removal of flux residues from printed circuit boards), and vapor degreasing applications. Many CFCs, CFC-113 particularly, possess a valuable combination of solvency, non-flammability, and low toxicity, that make them ideally suited for many challenging solvent cleaning applications. But while these materials were initially believed to be environmentally benign, they now are linked to ozone depletion. According to the Montreal Protocol and its attendant amendments, production and use of CFCs must be discontinued (see, e.g. P. S. Zurer, *Looming Ban on Production of CFCs, Halons Spurs Switch to Substitutes*, CHEM. & ENG'G NEWS, Nov. 15, 1993, at 12).

Many performance characteristics are sought in CFC and HCFC replacements. Such replacements typically are required to possess low ozone depletion potential, low flammability, and low toxicity, and to have boiling point ranges that are suitable for a variety of solvent cleaning applications. Ideal replacement solvents also have the ability to dissolve both hydrocarbon-based and fluorocarbon-based soils.

There remain, however, solvent cleaning applications that require solvent characteristics not optimally possessed by any one replacement material. Among the most challenging solvent cleaning applications is the requirement of a solvent or solvent blend material that is non-flammable under conditions of cleaning and that exhibits a requisite solvency toward silicones and other difficulty-dissolved contaminant materials (e.g., hydraulic fluids and the like). These solvent compositions must also be compatible with (i.e., not act aggressively toward) protective coatings and plastic parts.

SUMMARY OF THE INVENTION

Briefly, in one aspect, the present invention provides a non-flammable composition comprising:

(a) a major amount of one or more highly fluorinated compound(s) having a boiling point less than about 100° C.;

(b) a minor amount of one or more fluorinated compound(s) containing at least one aromatic moiety and having a boiling point between about 100° C. and about 140° C.; and (c) a minor amount of trans-1,2-dichloroethylene.

The present invention also includes methods of cleaning and coating using the above-described compositions. The compositions of the present invention provide non-flammable solvent blends capable of dissolving silicones, non-volatile hydraulic fluids, and other difficulty-dissolved contaminant materials, while exhibiting compatibility with plastics and protective coatings.

DETAILED DESCRIPTION OF PREFERRED EMBODIMENTS

Figure 1:
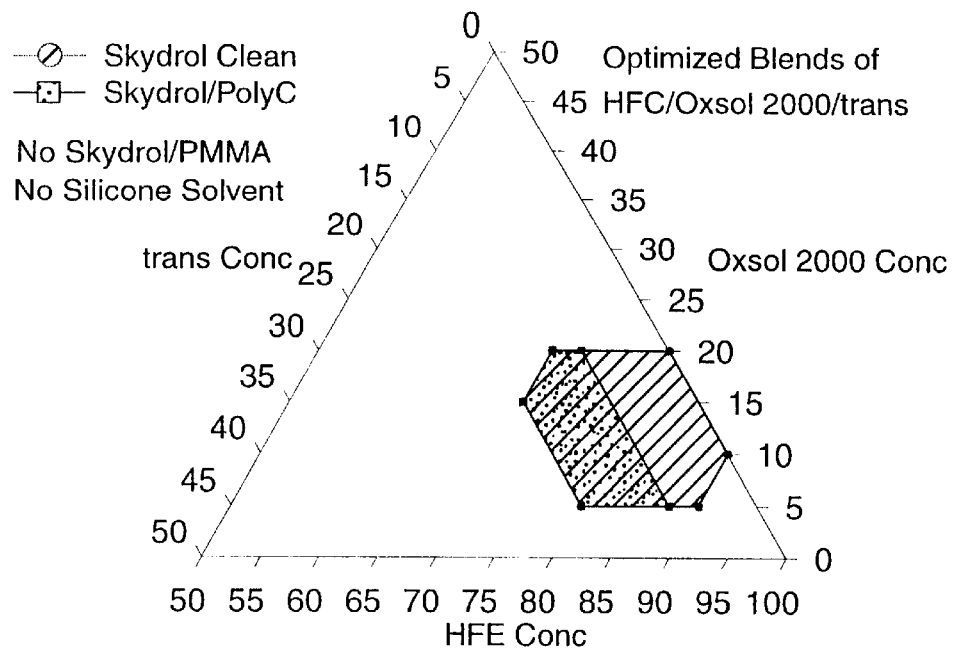
FIGS. 1–3 present ternary diagrams that outline non-flammable solvent compositions comprising a hydrofluoroether, a fluorinated aromatic compound, and trans-1,2-dichloroethylene. The compositional ranges diagramed by the Figures represent solvent compositions optimally formulated to exhibit solvency toward silicone and hydraulic fluids and compatibility with polycarbonate and polymethylmethacrylate materials.

The present invention advantageously provides compositions useful as cleaning and/or coating compositions which are non-flammable, readily-dissolve silicones and other difficult-to-dissolve materials (e.g., soils, contaminants); and are compatible with protective coatings and plastic parts. Additionally, these compositions are "environmentally friendly."

Any non-flammable highly fluorinated compound having a boiling point less than about 100° C.(preferably less than about 85° C.) is suitable as a composition of the present invention. "Non-flammable" compositions pass the Test for Flammability of Compositions defined in the Example section herein. "Non-flammable" highly fluorinated compounds are those that have no closed cup flash point as measured by conventional methods. Such compounds typically will contain from 4 to about 8 carbon atoms and may optionally contain one or more catenary (i.e., "in-chain") heteroatoms, such as divalent oxygen or trivalent nitrogen atoms, and additionally may optionally contain one or more chlorine atoms. "Highly" fluorinated compound is defined herein as containing more fluorine atoms than hydrogen atoms.

Specific classes of useful non-flammable highly fluorinated compounds include highly fluorinated ethers (usually referred to as "hydrofluoroethers" or "HFEs"), highly fluorinated hydrocarbons (usually referred to as "hydrofluorocarbons" or "HFCs"), and highly fluorinated and partially chlorinated ethers (usually referred to as "hydrochlorofluoroethers" or "HCFEs").

Generally the most suitable non-flammable highly fluorinated compounds will be hydrofluoroethers. HFEs are chemical compounds containing carbon, fluorine, hydrogen, one or more ether oxygen atoms, and optionally one or more additional catenary heteroatoms within the carbon backbone, such as sulfur or nitrogen. The HFE can be straight-chained, branched-chained, or cyclic, or a combination thereof, such as alkylcycloaliphatic. Preferably, the HFEs are free of unsaturation. These highly fluorinated ethers may be depicted by the general formula.

$$(R_1\text{—O})_n\text{—}R_2 \tag{I}$$

where, in reference to Formula I, n is a number from 1 to 3 inclusive and $R_1$ and $R_2$ are the same or are different from one another and are selected from the group consisting of alkyl, aryl, and alkylaryl groups. At least one of $R_1$ and $R_2$ contains at least one fluorine atom, and at least one of $R_1$ and $R_2$ contains at least one hydrogen atom. $R_1$ and $R_2$ may also be linear, branched, or cyclic, and may contain one or more unsaturated carbon-carbon bonds.

Preferred HFEs include: (1) segregated UFEs, wherein ether-bonded alkyl or alkylene, etc., segments of the HFE are either perfluorinated (e.g., perfluorocarbon) or non-fluorinated (e.g., hydrocarbon), but not partially fluorinated; and (2) non-segregated HFEs, wherein at least one of the ether-bonded segments is neither perfluorinated nor fluorine-free but is partially fluorinated (i.e., contains a mixture of fluorine and hydrogen atoms).

Segregated HFEs include HFEs which comprise at least one mono-, di-, or trialkoxy-substituted perfluoroalkane, perfluorocycloalkane, perfluorocycloalkyl-containing perfluoroalkane, or perfluorocycloalkylene-containing perfluoroalkane compound. These HFEs are described, for example, in WO 96/22356, and can be represented below in Formula II:

$$R_f\text{—}(O\text{—}R_h)_x \qquad (II)$$

wherein:

x is from 1 to about 3, and $R_f$ is a perfluorinated hydrocarbon group having a valency x, which can be straight, branched, or cyclic, etc., and preferably contains from 3 to about 7 carbon atoms, and more preferably contains from 3 to about 6 carbon atoms;

each $R_h$ is independently a linear or branched alkyl group having from 1 to about 3 carbon atoms;

wherein either or both of the groups $R_f$ and $R_h$ can optionally contain one or more catenary heteroatoms;

wherein the sum of the number of carbon atoms in the $R_f$ group and the number of carbon atoms in the $R_h$ group(s) is preferably between 4 and about 8.

Preferably, x is 1. Most preferable $R_f$ groups include $C_4F_9$-isomers (i.e., n-, iso-, sec-, tert-), $C_5F_{11}$-isomers, $C_6F_{13}$-isomers, perfluorocyclohexyl, and $C_7F_{15}$-isomers; and most preferable $R_h$ groups include methyl, ethyl, n-propyl, and iso-propyl.

Representative compounds described by Formula II useful in the present invention include, but are not limited to, the following compounds:

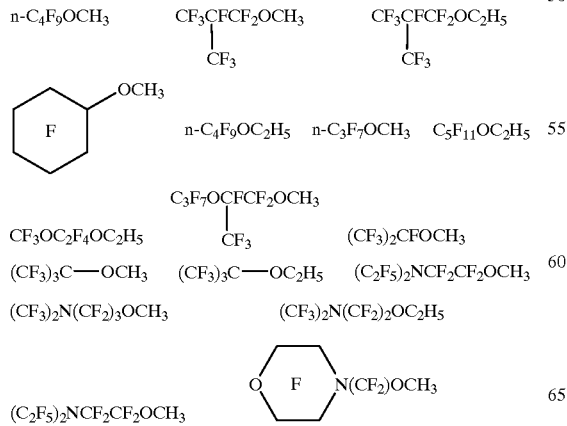

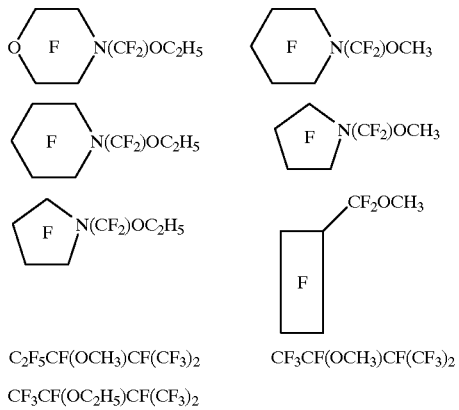

$C_2F_5CF(OCH_3)CF(CF_3)_2$     $CF_3CF(OCH_3)CF(CF_3)_2$ $CF_3CF(OC_2H_5)CF(CF_3)_2$ wherein cyclic structures designated with an interior "F" are perfluorinated.

Particularly preferred segregated HFEs of Formula II include n-$C_3F_7OCH_3$, $(CF_3)_2CFOCH_3$, n-$C_4F_9OCH_3$, $(CF_3)_2 CFCF_2OCH_3$, n-$C_3F_7OC_2H_5$, n-$C_4F_9OC_2H_5$, $(CF_3)_2 CFCF_2OC_2H_5$, $(CF_3)_3COCH_3$, $(CF_3)_3COC_2H_5$, $CF_3CF(OOCH_3)CF(CF_3)_2$, $CF_3CF(OC_2H_5)CF(CF_3)_2$, and mixtures thereof. Commercially available segregated HFEs include 3M™ NOVEC™ HFE-7100 and HFE-7200 specialty liquids (available from Minnesota Mining and Manufacturing Company, St. Paul, Minn.).

Useful non-flammable, non-segregated HFEs include alpha-, beta- and omega-substituted hydrofluoroalkyl ethers such as those described in U.S. Pat. No. 5,658,962 (Moore et al.), incorporated herein by reference, which can be described by the general structure shown in Formula III:

$$X\text{—}[R_f'\text{—}O]_yR''H \qquad (III)$$

wherein:

X is either F, H, or a perfluoroalkyl group containing from 1 to 3 carbon atoms;

each $R_f'$ is independently selected from the group consisting of —$CF_2$—, —$C_2F_4$—, and —$C_3F_6$—;

R" is a divalent organic radical having from 1 to about 3 carbon atoms, and is preferably perfluorinated; and y is an integer from 1 to 7;

wherein when X is F, R" contains at least one F atom.

Representative compounds described by Formula III useful in the present invention include, but are not limited to, the following compounds:

$C_4F_9OC_2F_4H$     $HC_3F_6OC_3F_6H$     $HC_3F_6OCH_3$ $C_5F_{11}OC_2F_4H$     $C_6F_{13}OCF_2H$     $C_3F_7OCH_2F$ $HCF_2OCF_2OCF_2H$     $HCF_2OCF_2OC_2F_4OCF_2H$ $C_3F_7O[CF(CF_3)CF_2O]_pCF(CF_3)H$ wherein p = 0 to 1

$HCF_2OC_2F_4OCF_2H$     $HCF_2OCF_2OCF_2OCF_2H$ $HCF_2OC_2F_4OC_2F_4OCF_2H$

Preferred non-flammable, non-segregated HFEs include $C_4F_9OC_2F_4H$, $C_6F_{13}OCF_2H$, $HC_3F_6OC_3F_6H$, $C_3F_7OCH_2F$, $HCF_2OCF_2OCF_2H$, $HCF_2OCF_2CF_2OCF_2H$, $HC_3F_6OCH_3$, $HCF_2OCF_2OC_2F_4OCF_2H$, and mixtures thereof. Commercially available non-segregated HFEs specialty liquids are available from Ausimont Corp., Milano, Italy, under the "GALDEN H" trade name.

Useful non-flammable hydrofluorocarbons include HFCs selected from the group consisting of:

(1) linear or branched compounds of Formula IV:

$C_4H_nF_{10-n}$, wherein n<5　　　　　　　　　　(IV)

representative compounds of Formula IV include $CHF_2(CF_2)_2CF_2H$, $CF_3CF_2CH_2CH_2F$, $CF_3CH_2CF_2CH_2F$, $CH_3CHFCF_2CF_3$, $CF_3CH_2CH_2CF_3$, $CH_2FCF_2CF_2CH_2F$, $CHF_2CH(CF_3)CF_3$, and $CHF(CF_3)CF_2CF_3$;

(2) linear or branched compounds of Formula V:

$C_5H_nF_{12-n}$, wherein n<6　　　　　　　　　　(V)

representative compounds of Formula V include $CF_3CH_2CHFCF_2CF_3$, $CF_3CHFCH_2CF_2CF_3$, $CF_3CH_2CF_2CH_2CF_3$, $CF_3CHFCHFCF_2CF_3$, $CF_3CH_2CH_2CF_2CF_3$, $CH_3CHFCF_2CF_2CF_3$, $CF_3CF_2CF_2CH_2CH_3$, $CH_3CF_2CF_2CF_2CF_3$, $CF_3CH_2CHFCH_2CF_3$, $CH_2FCF_2CF_2CF_2CF_3$, $CHF_2CF_2CF_2CF_2CF_3$, $CH_3CF(CHFCHF_2)CF_3$, $CH_3CH(CF_2CF_3)CF_3$, $CHF_2CH(CHF_2)CF_2CF_3$, $CHF_2CF(CHF_2)CF_2CF_3$, and $CHF_2CF_2CF(CF_3)_2$;

(3) linear or branched compounds of Formula VI:

$C_6H_nF_{14-n}$, wherein n<7　　　　　　　　　　(VI)

representative compounds of Formula VI include $CHF_2(CF_2)_4CF_2H$, $(CF_3CH_2)_2CHCF_3$, $CH_3CHFCF_2CHFCHFCF_3$, $HCF_2CHFCF_2CF_2CHFCF_2H$, $H_2CFCF_2CF_2CF_2CF_2CF_2H$, $CHF_2CF_2CF_2CF_2CF_2CHF_2$, $CHF_2CF_2CF_2CF_2CF_3$, $CH_3CF(CF_2H)CHFCHFCF_3$, $CH_3CF(CF_3)CHFCHFCF_3$, $CH_3CF_2C(CF_3)_2CF_2CH_3$, $CH_3CF(CF_3)CF_2CF_3$, $CHF_2CF_2CH(CF_3)CF_2CF_3$, and $CHF_2CF_2CF(CF_3)CF_2CF_3$;

(4) linear or branched compounds of Formula VII:

$C_7H_nF_{16-n}$, wherein n<8　　　　　　　　　　(VII)

representative compounds of Formula VII include $CH_3CHFCH_2CF_2CHFCF_2CF_3$, $CH_3(CF_2)_5CH_3$, $CH_3CH_2(CF_2)_4CF_3$, $CF_3CH_2CH_2(CF_2)_3CF_3$, $CH_2FCF_2CHF(CF_2)_3CF_3$, $CF_3CF_2CF_2CHFCF_2CF_3$, $CF_3CF_2CF_2CHFCF_2CF_2CF_3$, $CH_3CH(CF_3)CF_2CF_2CF_2CH_3$, $CH_3CF(CF_3)CH_2CFHCF_2CF_3$, $CH_3CF(CF_2CF_3)CHFCF_2CF_3$, $CH_3CH_2CH(CF_3)CF_2CF_2CF_3$, $CHF_2CF(CF_3)(CF_2)_3CH_2F$, and $CHF_2CF(CF_3)(CF_2)_3CF_3$;

(5) highly fluorinated cyclopentyl compounds such as:

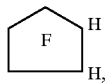 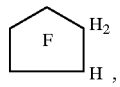 and 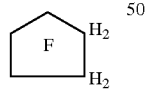

Preferred non-flammable HFCs include $CF_3CFHCFHCF_2CF_3$, $C_5F_{11}H$, $C_6F_{13}H$, $CF_3CF_2CH_2CH_2F$, $CHF_2CF_2CF_2CHF_2$, 1,2-dihydroperfluorocyclopentane, and 1,1,2-trihydroperfluorocyclopentane. Useful hydrofluorocarbons include commercially available hydrofluorocarbons under the "VERTREL" trade name from E. I. duPont de Numours, Wilmington, Del., and under the "ZEORORA-H" trade name from Nippon Zeon, Tokyo, Japan.

Useful non-flammable hydrochlorofluoroethers include HCFEs which can be described by the general structure shown in Formula VIII:

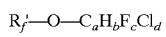

$R_f'-O-C_aH_bF_cCl_d$　　　　　　　　　　(VIII)

wherein $R_f'$ is a perfluoroalkyl group preferably having at least 3 to about 6 carbon atoms, and optionally containing a catenary heteroatom such as nitrogen or oxygen; "a" preferably is from 1 to about 4; "b" is at least 1; "c" can range from 0 to about 2; and "d" is at least 1. Such HCFEs are described in WO 99/14175, which is incorporated herein by reference. Specific useful HCFEs include $(CF_3)_2CFOCHCl_2$, $(CF_3)_2CFOCH_2Cl$, $CF_3CF_2CF_2OCHCl_2$, $CF_3CF_2CF_2OCH_2Cl$, $(CF_3)_2CFCF_2OCHCl_2$, $(CF_3)_2CFCF_2OCH_2Cl$, $CF_3CF_2CF_2CF_2OCHCl_2$, $CF_3CF_2CF_2CF_2OCH_2Cl$, $(CF_3)_2CFCF_2OCHClCH_3$, and $CF_3CF_2CF_2CF_2OCHClCH_3$.

The selected highly fluorinated compound is blended with a minor amount of trans-1,2-dichloroethylene and a minor amount of one or more fluorinated compounds containing at least one aromatic moiety and having a boiling point between about 100° C. and about 140° C. (preferably between about 100° C. and about 120° C.). This latter class of compounds includes, for example, fluorinated mono-, di- and trialkyl aromatic compounds, including xylene and toluene derivatives. Preferred among these compounds are fluoroalkyl substituted compounds, such as hexafluoroxylene, benzotrifluoride, and para-chlorobenzotrifluoride. Such compounds are commercially available, for example, under the "OXSOL" tradename from Occidental Chemical Corp., Grand Island, N.Y.

The concentrations of each of the three primary components of the non-flammable composition will be determined in large measure by the particular characteristics sought for the composition. For example, compositions that exhibit silicone solvency may be formulated differently from compositions that are intended to clean non-volatile hydraulic fluids. Generally the highly fluorinated compound will comprise between about 50 and about 90 weight percent of the blend by weight, the fluorinated aromatic compound will comprise between about 5 and about 35 weight percent, and trans-1,2-dichloroethylene will comprise between about 0.5 and about 30 weight percent. The particular compounds chosen to constitute the composition also will depend in part upon the desired performance characteristics sought for the cleaning composition. For example, those highly fluorinated ethers depicted above by Formula II may be chosen where plastics compatibility is desired, whereas a highly fluorinated alkane (e.g., 2,3-dihydroperfluoropentane) might be chosen where optimal hydraulic fluid solvency is desired.

Particularly useful non-flammable highly fluorinated compositions include the following:

(1) For silicone solvency:
  75–80 weight percent hydrofluoroether
  10–23 weight percent benzotrifluoride
  2–10 weight percent trans-1,2-dichloroethylene
(2) Also for silicone solvency:
  57–73 weight percent hydrofluoroether
  10–25 weight percent hexafluoroxylene
  10–20 weight percent trans-1,2-dichloroethylene
(3) For hydraulic fluid solvency:
  80–85 weight percent hydrofluoroether
  10–18 weight percent benzotrifluoride
  2–10 weight percent trans-1,2-dichloroethylene
(4) Also for hydraulic fluid solvency:
  70–90 weight percent hydrofluorocarbon
  5–20 weight percent benzotrifluoride
  0.5–15 weight percent irans-1,2-dichloroethylene The compositions of the present invention may also be formulated with one or more conventional additives and/or adjuvants useful for the purpose to which the composition will be employed. For example, one or more surfactants, rust and corrosion inhibitors, lubricious materials, antioxidants, antibacterial agents, defoamers, dyes, freezing point depressants, pH buffers, or the like, may be added to the solvent blends to create the composition.

The cleaning process of the present invention can be carried out by contacting a contaminated substrate with the non-flammable composition (here a cleaning composition). The compositions may be used in a liquid state, and any technique for "contacting" a substrate may be employed. For example, a liquid cleaning composition can be sprayed or brushed onto the soiled substrate, used to wet an absorbent cloth or towel for wiping a soiled surface, or the substrate can be immersed in a liquid composition. The composition may also be delivered to the substrate as an aerosol using a suitable propellant. Ultrasonic energy and/or agitation may also be used to facilitate the cleaning. Various different solvent cleaning techniques are described by B. N. Ellis in *Cleaning and Contamination of Electronics Components and Assemblies*, Electrochemical Publications Limited, Ayr, Scotland, pages 182–194 (1986).

Both organic and inorganic substrates can be cleaned by the process of the present invention. Representative substrates include, but are not limited to, metals, ceramics, glass, polycarbonate, polystyrene, polyacrylate, acrylonitrile-butadiene-styrene copolymer, natural and synthetic fibers (and fabrics derived therefrom), and composites of the foregoing materials. The compositions of the present invention are particularly useful to clean substrates containing plastic materials or delicate protective coatings. Therefore, compositions find particular utility in the cleaning of silicone contaminants from plastic components such as those commonly used in the manufacture of medical or prosthetic equipment made from polycarbonates and polyacrylates. Suitably formulated compositions of the present invention also will find utility in cleaning aircraft equipment coated with an industry standard corrosion inhibition coating (CIC), which are typically solutions of dinitrocresol. Such coatings are available commercially, for example, under the "DINITROL" tradename from Dinol, Inc. of Burien, Wash., and those available as D-5023NS and D-5029NS from Zip-Chem of San Jose, Calif.

The described cleaning process can be used to dissolve or remove most contaminants from the surface of a substrate. For example, materials such as light hydrocarbon contaminants; higher molecular weight hydrocarbon contaminants such as mineral oils and greases; fluorocarbon contaminants such as perfluoropolyethers, bromotrifluoroethylene oligomers (gyroscope fluids), and chlorotrifluoroethylene oligomers (hydraulic fluids and lubricants); silicone oils and greases; solder fluxes; particulates; and other contaminants encountered in precision, electronic, metal, and medical device cleaning can be removed.

The compositions of the present invention are useful not only in cleaning applications, but can also be employed in coating deposition methods where the compositions of the invention function as a carrier for a coating material to enable deposition on the surface of a substrate. The invention thus also provides a coating composition for depositing a coating on a substrate surface using the composition. This process comprises, in its most essential aspect, applying to at least a portion of at least one surface of a substrate a coating of a non-flammable liquid coating composition that comprises: (a) a solvent composition as previously described; and (b) at least one coating material that is soluble or dispersible in the solvent composition. Preferably, the process further comprises the step of removing the solvent composition from the coating by, e.g., allowing evaporation (which can be aided by the application of, e.g., heat or vacuum). This process can be particularly useful for coating medical devices and equipment with silicone lubricants.

The following examples are offered to aid in the understanding of the present invention and are not to be construed as limiting the scope thereof. Unless otherwise indicated, all parts and percentages are by weight.

EXAMPLES

Test Methods

Tests for Solvency:

Hydraulic fluid solubility was measured as the minimum concentration of hydraulic fluid that provides a clear, miscible solution. About 2 milliliters of composition of the present invention were added to a tared capped glass vial. The composition weight was measured and recorded. SKYDROL™ LD-4, available from Monsanto Chemical Co., St. Louis, Mo., was added dropwise until this mixture became clear at which point the total weight of the mixture was recorded and the weight percent of SKYDROL™ LD-4 was calculated. Acceptable performance is defined as the point when the minimum concentration that provides a clear, miscible solution of the SKYDROL™ LD-4 fluid in the test mixture is less than or equal to 30 weight percent.

Silicone solubility was measured as the maximum concentration that could be dissolved as a clear solution before the added silicone produces a cloudy mixture and the addition of more silicone would produce two layers. About 2 milliliters of composition of the present invention were added to a tared capped glass vial and the fluid weight was recorded. MED-361™, 0.35 Pa-sec silicone fluid available from Nusil Technology, Carpinteria, Calif., was added dropwise until this mixture became cloudy. The total weight of the mixture then was recorded and the weight percent of dissolved silicone was calculated. Acceptable performance is defined as the point when the maximum concentration of the silicone that can be dissolved in the test mixture is greater than or equal to 2 weight percent.

Test for Flammability of Compositions:

The compositions were tested for flammability by placing 1 milliliter of the composition into an open aluminum pan (6 centimeters diameter by 1.5 centimeters high) and holding a butane flame in contact with the vapor above the liquid composition. The ignition source was repeatedly contacted with the vapor phase for approximately one second intervals until the composition evaporated to dryness or the composition ignited and sustained burning. The results were assigned a numeric value of 1 through 4 based upon the following criteria:

1. No flame enhancement;
2. Flame enhancement but no sustained burning, flame self-extinguishes within one second after removal of ignition source;
3. Flame enhancement with sustained flame for greater than one second after removal of ignition source however flame always self-extinguishes; and
4. Vapors sustain burning as long as liquid composition is present in the pan.

A rating of 1 or 2 during evaporation is acceptable flammability.

Cleaning Performance Test for Removal of SKYDROL™ LD-4 Hydraulic Fluid:

The cleaning performance of each composition of the present invention tested in its ability to remove hydraulic fluid was evaluated by placing one drop of SKYDROL™ LD-4 hydraulic fluid onto a plain glass microscope slide near the top of the slide which had been set in a vertical position at a 45–60 degree angle from the horizontal direction. After the drop had spread to the bottom of the glass slide, 1.5 milliliters of the tested composition was squirted onto the slide with a 5-milliliter disposable pipet in an attempt to rinse off, or remove, the hydraulic fluid. The resulting appearance of the glass slide was recorded and the following rating system was assigned to these results.

1. Fair or Poor (Some residue or a substantial quantity of residue remaining);
2. Good (Slight residue, visible even without close inspection, but a substantial amount of soil removed);
3. Very Good (Almost no residue, visible only upon close inspection); and
4. Excellent (No visible residue).

A rating of 2 or greater is acceptable.

Test for Compatibility of Compositions with Aircraft Corrosion Inhibiting Compound (CIC) Coating:

CIC compatibility was tested using CIC coated aluminum Q-panels. Each panel was prepared by pouring DINITROL™ AV30 corrosion inhibiting compound onto one side of a clean aluminum Q-panel while holding it nearly vertical and allowing the excess to drain off into a beaker. The freshly coated panels were placed on a paper towel on a flat surface with the coated side up to air dry at room temperature overnight, or longer, before using them for the compatibility test.

The compatibility of each composition of the present invention tested with the CIC coating was evaluated by sectioning each CIC coated test panel into approximately 1.25 centimeter by 5 centimeter sections using tape and then applying about 0.5 milliliter of a tested composition, dropwise, using a 5-milliliter disposable pipet to a section of one of these panels that was tipped up vertically at a 60 degree angle to the horizontal direction. The resulting appearance of the CIC coating was then recorded and the following rating system was assigned to these results.

1. Nearly complete removal of the CIC;
2. Some removal of the CIC;
3. Change in appearance of the CIC, but no apparent removal of the CIC; and
4. No apparent change of the CIC.

A rating of 2 or greater is acceptable.

Test for Compatibility of Compositions with Either Polycarbonate or Polymethylmethacrylate (PMMA):

The polycarbonate and PMMA compatibility testing was done by placing a 1.25 centimeter square, 0.3 centimeter thick, piece of either polycarbonate or polyacrylate (obtained from Minnesota Plastics, Inc., Eden Prairie, Minn.), into a 29 milliliter glass vial, then adding 6 milliliters of the composition of the present invention tested to the vial, and then covering the vial with a metal cap and allowing it to sit undisturbed at room temperature. The change in appearance by visual inspection of each material specimen was recorded after 1 hour exposure to the tested composition and then after overnight exposure of the same specimen to the tested composition. Each specimen was visually inspected after removal from the fluid and air drying. The following rating system was assigned to the results.

1. Significant change (hazy or wavy lines on surface or worse) after both 1 hour and overnight exposure;
2. Slight change after 1 hour and significant change after overnight exposure;
3. No apparent change after 1 hour and significant change after overnight exposure;
4. No apparent change after 1 hour and slight change after overnight exposure; and
5. No apparent change after both 1 hour and overnight exposure.

A rating of 3 or greater is acceptable.

Figure 2:
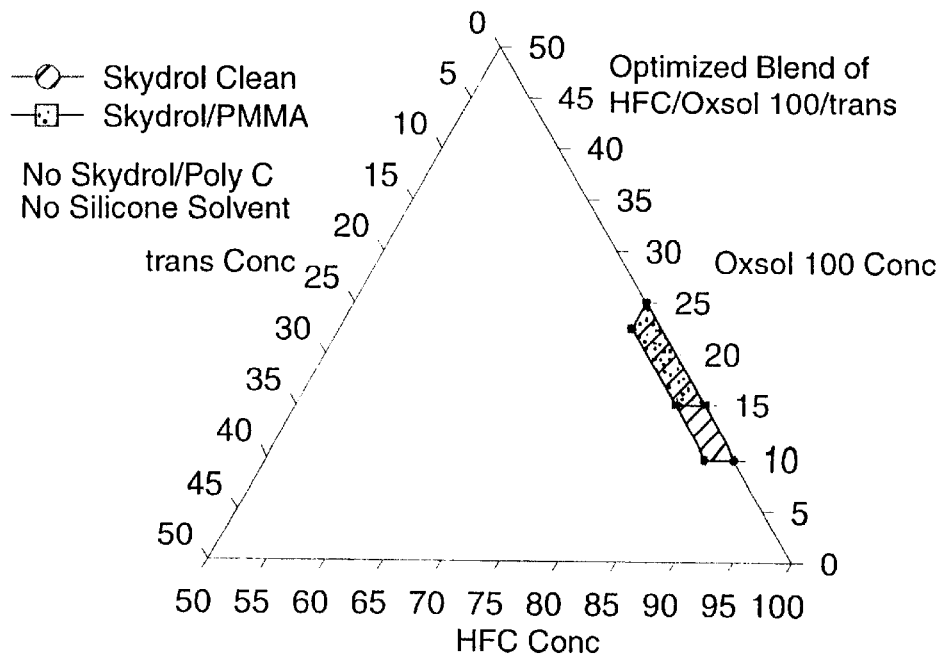
Figure 3:
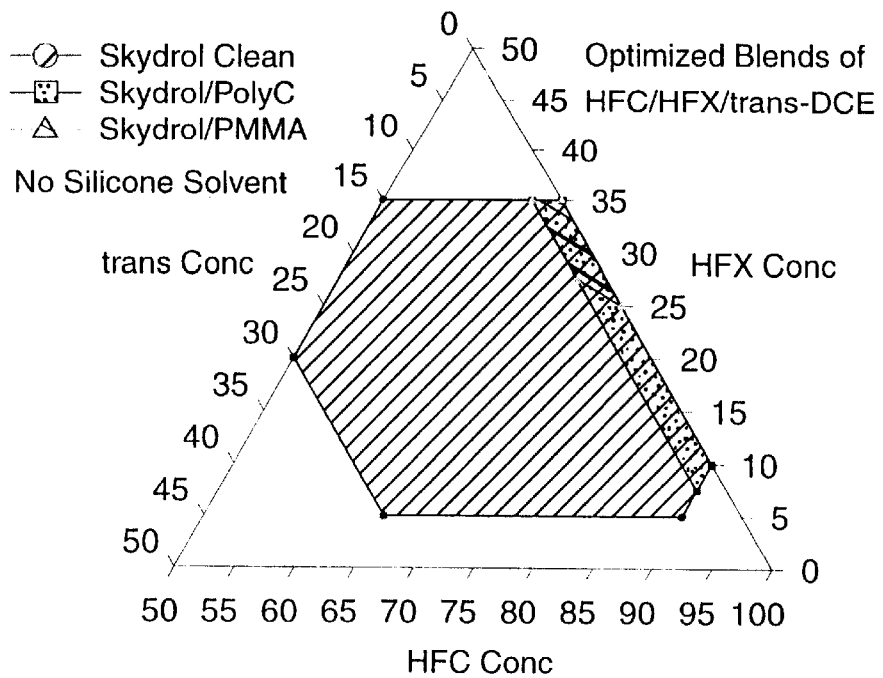
Figure 4:
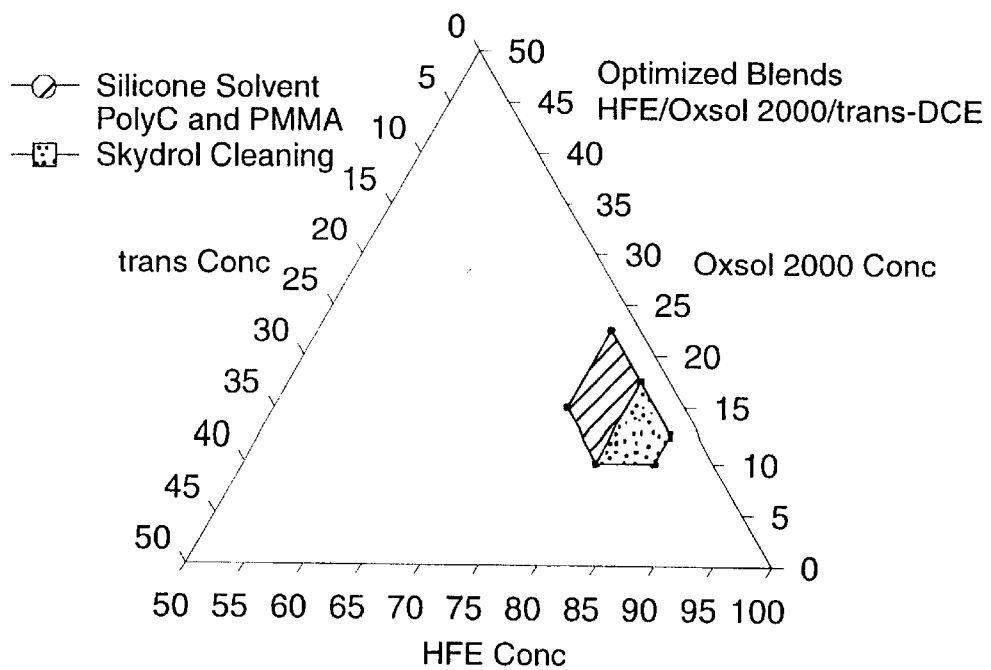
FIGS. 4–6 present ternary diagrams that outline non-flammable solvent compositions comprising a highly fluorinated alkane, a fluorinated aromatic compound, and trans-1,2-dichloroethylene. The compositional ranges diagramed by the Figures represent solvent compositions optimally formulated to exhibit solvency toward hydraulic fluids and compatibility with polycarbonate and polymethylmethacrylate materials.
Figure 5:
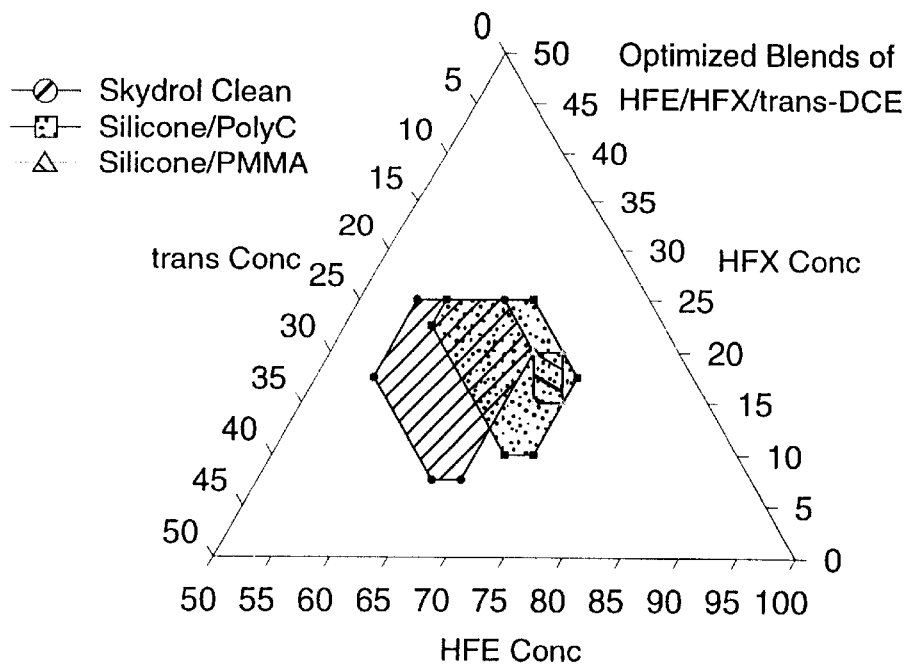
Figure 6:
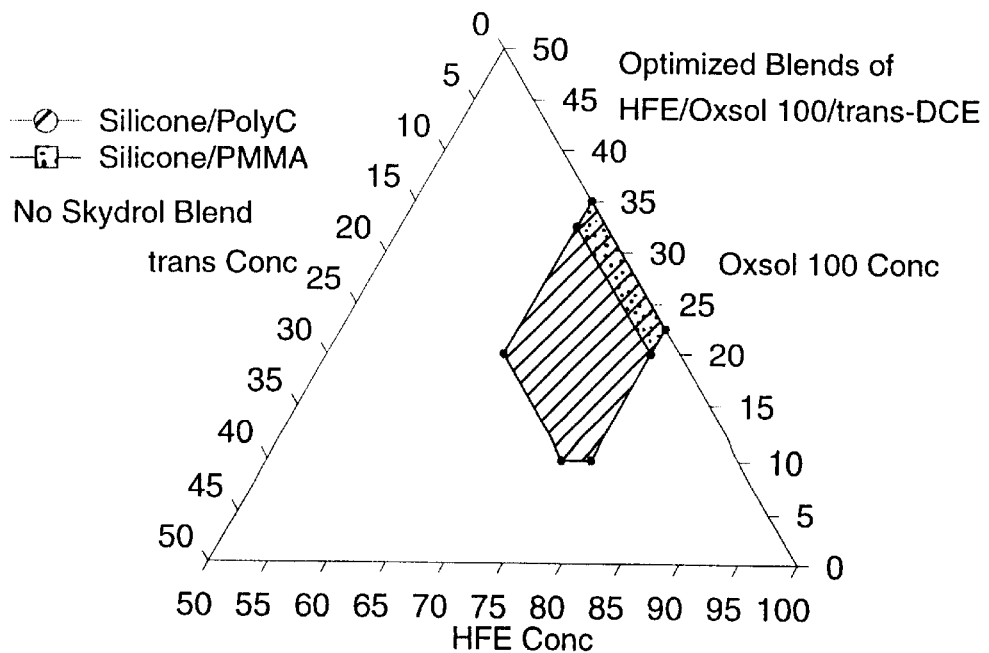

Flammability, silicone solvency, and compatibility with PMMA and polycarbonate were evaluated according to the tests described above to determine regions of acceptable performance. These results were plotted on ternary diagrams and then overlaid to find zones of tested compositions that had the properties of interest. FIGS. 1 through 6 show the blend compositions that resulted. Table 1 sets forth formulation resulting from these optimization experiments (i.e., the numerical description of these regions).

The following solvents were evaluated:

(1) Hexafluoroxylene ("HFX"), available from Occidental Chemical
(2) $C_4F_9OCH_3$, available as HFE-7100 from Minnesota Mining and Manufacturing Company
(3) Benzotrifluoride, available as OXSOL™ 2000 from Occidental Chemical
(4) Para-chlorobenzotrifluoride, available as OXSOL™ 100 from Occidental Chemical
(5) 2,3-dihydroperfluoropentane ("HFC"), available as VERTREL™ XF from E. I. duPont de Numours
(6) Trans-1,2-dichloroethylene (t-DCE), available from PPG Industries, Pittsburgh, Pa.

TABLE 1

| Blended Solvents | Application | Formulation Range | Compatible with: |
|---|---|---|---|
| HFE-7100 | Silicone Solvent: | 75–80 | PMMA, |
| OXSOL ™ 2000 | Cleaning/Coating | 10–22.5 | Polycarbonate |
| t-DCE | | 2.5–10 | |
| HFE-7100 | Hydraulic Fluid | 80–85 | CIC, PMMA, |
| OXSOL ™ 2000 | Cleaning | 10–17.5 | Polycarbonate |
| t-DCE | | 2.5–10 | |
| HFE-7100 | Silicone Solvent: | 68–70 | PMMA, |
| HFX | Cleaning/Coating | 16–20 | Polycarbonate |
| t-DCE | | 10–14 | |
| HFE-7100 | Silicone Solvent: | 57.5–72.5 | Polycarbonate |
| HFX | Cleaning/Coating | 10–25 | |
| t-DCE | | 10–20 | |
| HFE-7100 | Hydraulic Fluid | 55–67.5 | CIC |
| HFX | Cleaning | 7.5–25 | |
| t-DCE | | 12.5–27.5 | |
| HFE-7100 | Hydraulic Fluid | 57.5–67.5 | CIC, Polycarbonate |
| HFX | Cleaning | 12.5–25 | |
| t-DCE | | 12.5–20 | |
| HFE-7100 | Silicone Solvent: | 65–77.5 | Polycarbonate |
| OXSOL ™ 100 | Cleaning/Coating | 10–35 | |
| t-DCE | | 0.5–15 | |
| HFE-7100 | Silicone Solvent: | 65–77.5 | PMMA, |
| OXSOL ™ 100 | Cleaning/Coating | 25–35 | Polycarbonate |
| t-DCE | | 0.5–2.5 | |
| HFC | Hydraulic Fluid | 70–90 | CIC |
| OXSOL ™ 2000 | Cleaning | 5–20 | |
| t-DCE | | 0.5–15 | |
| HFC | Hydraulic Fluid | 70–90 | CIC, Polycarbonate |
| OXSOL ™ 2000 | Cleaning | 5–20 | |
| t-DCE | | 7.5–15 | |
| HFC | Hydraulic Fluid | 50–90 | CIC |
| HFX | Cleaning | 5–35 | |
| t-DCE | | 0.5–30 | |
| HFC | Hydraulic Fluid | 62.5–90 | CIC, Polycarbonate |
| HFX | Cleaning | 7.5–35 | |
| t-DCE | | 0.5–2.5 | |
| HFC | Hydraulic Fluid | 62.5–75 | CIC, Polycarbonate, |

TABLE 1-continued

| Blended Solvents | Application | Formulation Range | Compatible with: |
|---|---|---|---|
| HFX | Cleaning | 25–35 | PMMA |
| t-DCE | | 0.5–2.5 | |
| HFC | Hydraulic Fluid | 75–87.5 | CIC, PMMA |
| OXSOL ™ 100 | Cleaning | 10–25 | |
| t-DCE | | 0.5–2.5 | |

Coating Examples

The following examples evaluate the ability of compositions of the present invention to deposit silicone coatings onto a sensitive plastic substrate. Solutions of 0.5 weight percent MED-361™ (viscosity 350 cps (0.35 Pa-sec)) from NuSil Technology, were prepared and evaluated for coating performance and plastics compatibility. Each solution was used to coat a 1 inch (2.54 cm) by 2.5 inch (6.35 cm) by 0.0675 inch (0.172 cm) panel of polycarbonate. The panels were immersed into the solution, held in the solution for 5 minutes and withdrawn at a rate of approximately 1 foot per minute (30.2 cm/minute). The panels were allowed to dry for 5 minutes followed by visual evaluation of the substrate and silicone oil coatings.

| | Solvent | Coating and Substrate Condition |
|---|---|---|
| Example A | 75 weight percent $C_4F_9OCH_3$, 20 weight percent OXSOL ™ 2000, 5 weight percent t-1,2-dichloroethylene | Even coating, no effect on the substrate |
| Example B | 70 weight percent $C_4F_9OCH_3$, 27.5 weight percent OXSOL ™ 100, 2.5 weight percent t-1,2-dichloroethylene | Even coating, no effect on the substrate |
| Example C | 60 weight percent $C_4F_9OCH_3$, 25 weight percent hexafluorometaxylene, 15 weight percent t-1,2-dichloroethylene | Even coating, no effect on the substrate |
| Comparative Example A | CFC-113 | Even coating, no effect on the substrate |
| Comparative Example B | HCFC-141b | Even coating, moderate haze on substrate |
| Comparative Example C | toluene | Coating not visually apparent due to extreme haze, opacity of substrate |

The above results demonstrate that the compositions of the present invention (Examples A–C) perform similarly to CFC-113. By comparison, solvents such as HCFC-141b and toluene produce inferior results due to incompatibility with the sensitive plastic substrate and flammability in the case of toluene.

Various modifications and alterations of this invention will be apparent to those skilled in the art without departing from the scope and spirit of this invention, and it should be understood that this invention is not limited to the illustrative embodiments set forth herein.

We claim:
1. A non-flammable composition comprising:
   (a) about 50 to about 90 weight percent of one or more highly fluorinated compound(s) selected from the group consisting of fluorinated ethers and hydrofluorocarbons having a boiling point less than about 100° C.;
   (b) about 5 to about 35 weight percent of one or more fluorinated compound(s) selected from the group consisting of mono-, di-, and tiialkyl aromatic compounds and having a boiling point between about 100° C. and about 140° C.; and
   (c) about 0.5 to about 30 weight percent of trans-1,2-dichloroethylene.
2. The composition of claim 1, wherein said highly fluorinated compound having a boiling point less than about 100° C. is a highly fluorinated ether.
3. The composition of claim 2, wherein said highly fluorinated ether is of the formula:

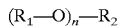
$$(R_1-O)_n-R_2$$

wherein:
   n is a number from 1 to 3 inclusive;
   $R_1$ and $R_2$ are the same or are different from one another and are selected from the group consisting of alkyl, aryl, and alkylaryl groups;
   wherein, at least one of $R_1$ and $R_2$ contains at least one fluorine atom, and at least one of $R_1$ and $R_2$ contains at least one hydrogen atom;
   and further, wherein one or both of $R_1$ and $R_2$ may be linear, branched, or cyclic; and may contain one or more unsaturated carbon-carbon bonds.
4. The composition of claim 2, wherein said highly fluorinated ether is of the formula:

$$R_fO-R_h)_x$$

wherein:
   x is from 1 to about 3;
   $R_f$ is a perfluorinated hydrocarbon group having a valency x, which can be straight, branched, or cyclic, and has from 3 to about 7 carbon atoms;
   each $R_h$ is independently a linear or branched alkyl group having from 1 to about 3 carbon atoms; and
   wherein the sum of the carbon atoms in the $R_f$ group and the $R_h$, group(s) is between 4 and about 8.
5. The composition of claim 4, wherein said highly fluorinated ether is selected from the group consisting of n-$C_3F_7OCH_3$, $(CF_3)_2CFOCH_3$, n-$C_4F_9OCH_3$, $(CF_3)_2CFCF_2OCH_3$, n-$C_3F_7OC_2H_5$, n-$C_4F_9OC_2H_5$, $(CF_3)_2CFCF_2OC_2H_5$, $(CF_3)_3COCH_3$, $(CF_3)_3COC_2H_5$, $CF_3CF(OCH_3)CF(CF_3)_2$, $CF_3CF(OC_2H_5)CF(CF_3)_2$, and mixtures thereof.
6. The composition of claim 2, wherein said highly fluorinated ether is of formula:

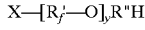
$$X-[R_f'-O]_yR''H$$

wherein:
   X is selected from the group consisting of F, H, or a perfluoroalkyl group containing from 1 to 3 carbon atoms;
   each $R_f'$ is independently selected from the group consisting of $-CF_2-$, $-C_2F_4-$, and $-C_3F_6-$;
   R" is a divalent organic radical having from 1 to about 3 carbon atoms; and y is an integer from 1 to 7;
further wherein when X is F, R" contains at least one F atom.

7. The composition of claim 6, wherein said highly fluorinated ether is selected from the group consisting of $C_4F_9OC_2F_4H$, $C_6F_{13}OCF_2H$, $HC_3F_6OC_3F_6H$, $C_3F_7OCH_2F$, $HCF_2OCF_2OCF_2H$, $HCF_2OCF_2CF_2OCF_2H$, $HC_3H_6OCH_3$, $HCF_2OCF_2OC_2F_4OCF_2H$, and mixtures thereof.

8. The composition of claim 1, wherein said highly fluorinated compound having a boiling point less than about 100° C. is highly fluorinated alkane.

9. The composition of claim 8, wherein said highly fluorinated alkane is selected from the group consisting of $CF_3CFHCFHCF_2CF_3$, $C_5F_{11}H$, $C_6F_{13}H$, $CF_3CF_2CH_2CH_2F$, $CHF_2CF_2CF_2CHF_2$, 1,2-dihydroperfluorocyclopentane, 1,1,2-trihydroperfluorocyclopentane, and mixtures thereof.

10. The composition of claim 1, wherein one or more of said fluorinated compound(s) containing at least one aromatic moiety and having a boiling point between about 100° C. and about 140° C. is selected from the group consisting of fluorinated mono-, di- and trialkyl substituted aromatic compounds, and mixtures thereof.

11. The composition of claim 1, wherein one or more of said fluorinated compound(s) containing at least one aromatic moiety and having a boiling point between about 100° C. and about 140° C. is selected from the group consisting of hexafluoroxylene, benzotrifluoride, para-chlorobenzotrifluoride, and mixtures thereof.

12. A non-flammable composition comprising between about 75 and about 80 weight percent of one or more hydrofluoroether(s), between about 10 and about 23 weight percent benzotrifluoride, and between about 2 and about 10 weight percent trans-1,2-dichloroethylene.

13. A non-flammable composition comprising between about 80 and about 85 weight percent of one or more hydrofluoroether(s), between about 10 and about 18 weight percent benzotrifluoride, and between about 2 and about 10 weight percent trans-1,2-dichloroethylene.

14. A non-flammable composition comprising between about 57 and about 73 weight percent of one or more hydrofluoroether(s), between about 10 and about 25 weight percent hexafluoroxylene, and between about 10 and about 20 weight percent trans-1,2-dichloroethylene.

15. A non-flammable composition comprising between about 70 and about 90 weight percent of one or more hydrofluorocarbon(s), between about 5 and about 20 weight percent benzotrifluoride, and between about 0.5 and about 15 weight percent trans-1,2-dichloroethylene.

* * * * *